W. F. MESCHENMOSER.
CONDUCTOR CABLE SUPPORT.
APPLICATION FILED NOV. 22, 1911.
1,118,035.
Patented Nov. 24, 1914.
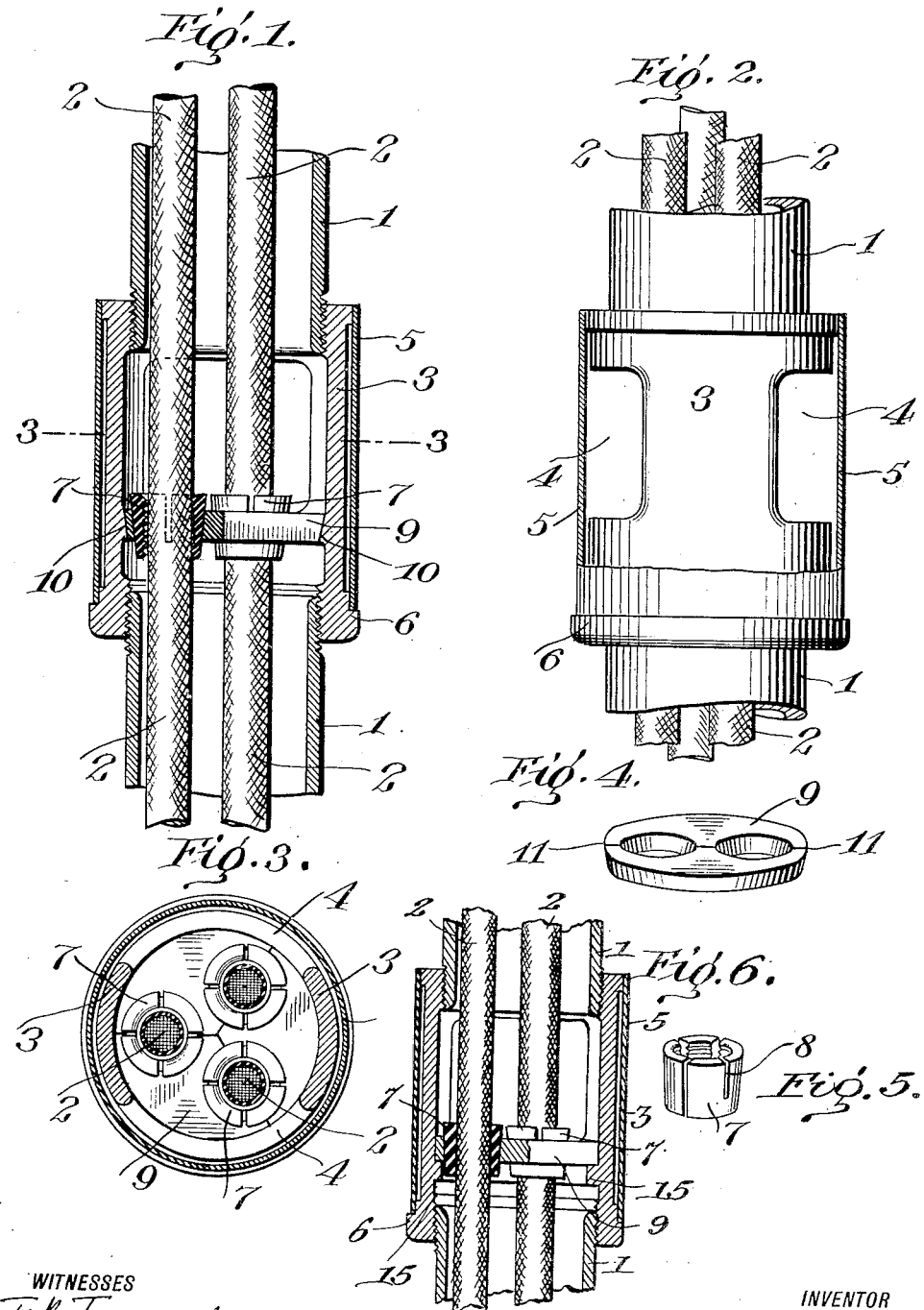
WITNESSES
F. B. Townsend
M. A. Porter
INVENTOR
William F. Meschenmoser
BY
Townsend & Decker
ATTORNEYS

UNITED STATES PATENT OFFICE.

WILLIAM F. MESCHENMOSER, OF NEW DORP, NEW YORK.

CONDUCTOR-CABLE SUPPORT.

1,118,035.  Specification of Letters Patent.  Patented Nov. 24, 1914.

Application filed November 22, 1911. Serial No. 661,658.

*To all whom it may concern:*

Be it known that I, WILLIAM F. MESCHENMOSER, a citizen of the United States, and a resident of New Dorp, in the county of Richmond and State of New York, have invented certain new and useful Improvements in Conductor-Cable Supports, of which the following is a specification.

My present invention relates to cable supports for electric wiring systems.

In large buildings, heavy trunk line cables are provided which cables usually run vertically from the top to the bottom of the building through protecting conduits or pipes and owing to their great length combined with their size and weight it is required that they be supported in the conduits or pipes at certain intervals throughout their length and that each cable be supported independently.

The object of this invention is to provide a device for supporting the cables that will take care of any desired number of separate cables without becoming bulky and cumbersome.

Another object is to provide a device which can be quickly and simply applied to the cables and which will effectively support them at any desired points; it being the further object to obviate the use of clamps employing clamping screws, the latter being too slow and cumbersome.

The invention consists in the improved cable support for electric conduits hereinafter more particularly described and then specified in the claims.

In the accompanying drawings, Figure 1 is a vertical section through a device constructed in accordance with this invention and shows the same as applied to a conduit carrying three cables. Fig. 2 is a side elevation and partial section of the same. Fig. 3 is a transverse section on the line 3, 3 Fig. 1. Fig. 4 is a detached perspective view of the partition preferably used with the device when but two cables are to be supported. Fig. 5 is a detached perspective view of one of the cable gripping bushings. Fig. 6 is a cross-section through the housing illustrating a modification in the manner of supporting the partition.

In the drawings, 1 indicates the protecting and inclosing conduit or pipe which usually runs the height of the building and through which the cables 2 pass. Instead of being continuous the conduit is interrupted at the points at which it is desired to support the cable so that the complete conduit is made up of a number of comparatively short lengths of pipe united by housings or bushings 3 in which are located the cable supporting devices to be presently described, the end of a length of pipe 1 being threaded and terminating in the housing or bushing 3. It will be understood that there are a number of these housings throughout the length of the conduit, but it is considered that for the purpose of illustrating the invention it will be sufficient to show but one.

The housing or bushing 3 might be of any desired and suitable construction and when of the form shown is provided with a longitudinal passage therethrough of a diameter at least equal to the inner diameter of the pipe 1. One or more openings 4 are provided in the side of the housing to permit access to the interior thereof and the insertion of the cable supporting devices. Normally the openings 4 are closed by a sleeve 5 which slips loosely over the housing and rests on an annular ledge 6 formed on the lower part of the housing. By merely sliding the sleeve 5 upward the openings 4 are exposed and when released it immediately drops back on the ledge 6 and closes the openings in the housing thus providing a complete uninterrupted protecting envelop for the cable.

It is required that the passage through the conduit be clear so the cables can be pulled straight through the entire length of the conduit and it is also preferred that the individual cables be supported independent of each other at various intervals throughout the length of the conduit. In the form illustrated in Figs. 1 to 3 inclusive, three separate cables or conductors are shown. After the cables are pulled through the conduit the required amount, the portions of the cables in the housing 3 are separated by access through the openings 4.

7 indicates bushings or sleeves preferably of insulating material and preferably divided longitudinally into two parts. The bushings are provided with serrated inner surfaces formed in any desired manner to provide teeth or projections for biting into the insulating covering of the cables. Each segment of the bushings is preferably slit as at 8 to permit the sides of the bushing to yield. The outer periphery of the bushing is inclined as shown. One of the bushings is applied to each conductor through the opening 4 in an obvious manner. To support the cables the bushings are seated in tapered openings formed in a plate or partition 9 inserted in the housing 3. As above stated it being required to first pull the cables through the conduit the plate or partition 9 is preferably made removable and to readily apply it to the bushings and cables without the necessity of threading the cables through the partition, the partition is made of a number of segments, the number depending upon the number and arrangement of conductors to be supported. When three conductors are to be supported the partition is divided into three segments along radial lines through the openings provided for the bushings 8. The outer periphery of the partition is preferably tapered and seats in a similarly tapered shoulder 10 formed on the inner wall of a continuous part of the housing 3 so that the pull on the cable will maintain it in place. If desired the outer periphery of the partition may be vertical and the partition be supported on lugs or seats 15 secured to the housing or bushing 3 as illustrated in Fig. 6. The parts of the partition are inserted through the opening 4, placed around the cables and seated on the tapered surface 10. By assembling the parts as shown and described any pull downward on the conductors will merely cause them to bind tighter in their supports while they can be readily unclamped by merely pulling up on the cable.

It will be noted that any number of cables or conductors can be separately supported in one conduit by this device and thus the necessity of providing an entirely separate support for each separate cable is dispensed with whereby the cost of material alone in an installation is greatly reduced and the facility with which the cables can be clamped and unclamped in their supports is much increased over the use of clamps operated by clamping screws or the like. When but two separate cables or conductors are employed, the form of partition shown in Fig. 4 is employed, which partition is merely divided diametrically on the line 11 into two parts.

It will be understood that I do not limit myself to the exact details of construction shown and described but various modifications might be resorted to without departing from the spirit of the invention as set forth in the appended claims.

What I claim as my invention is:

1. A cable support comprising a pipe or conduit, a bushing secured to the end of the pipe, a removable plate or partition divided into a plurality of parts and transversely disposed in said bushing and having an opening through which the cable passes and a bushing having a serrated surface engaging the sides of the cable, said latter-named bushing being provided with tapered sides fitting into the opening in said plate or partition.

2. A cable support comprising a pipe or conduit, a bushing secured to the end of said pipe, a removable partition transversely seated in said bushing and having openings through which the cables pass, said partition being divided diametrically through said openings and bushings provided with inwardly disposed projections engaging the sides of the cable, said latter-named bushings having tapered sides fitting into the openings in said partition.

3. A cable support comprising a housing having an opening in the side through which access may be had to the interior of the case, means at the ends of said housing for securing the ends of alined pipes or conduits, a plurality of longitudinally divided bushings having inwardly disposed projections adapted to engage the sides of the cables and provided with tapered yielding sides, means within said housing for supporting the tapered sides of said bushings and a sleeve adapted to slide over the outside of the housing and to close the opening in the side thereof.

Signed at New York in the county of New York and State of New York this 21st day of November A. D. 1911.

WILLIAM F. MESCHENMOSER.

Witnesses:
ADOLF SCHMINCKE,
F. B. TOWNSEND.